April 20, 1954 W. E. HABIG 2,676,039
SWIVEL COUPLING
Filed July 1, 1949 3 Sheets-Sheet 1
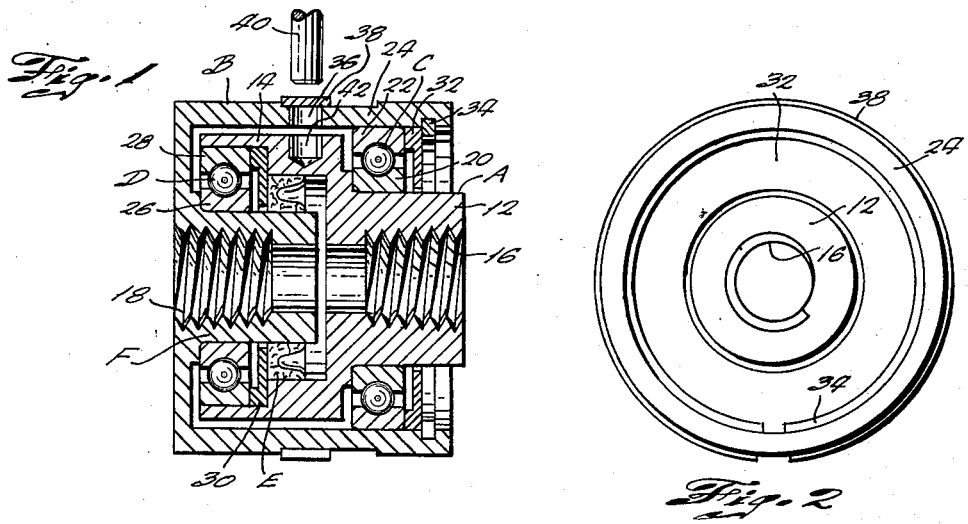
Fig. 1
Fig. 2
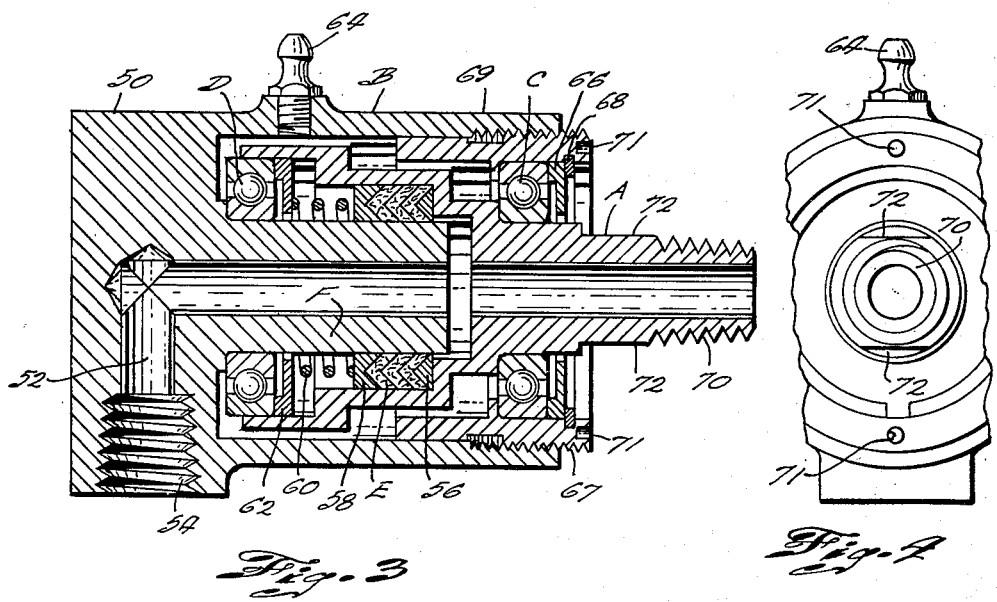
Fig. 3
Fig. 4
INVENTOR.
WILLIAM E. HABIG
BY
James and Franklin
ATTORNEYS.

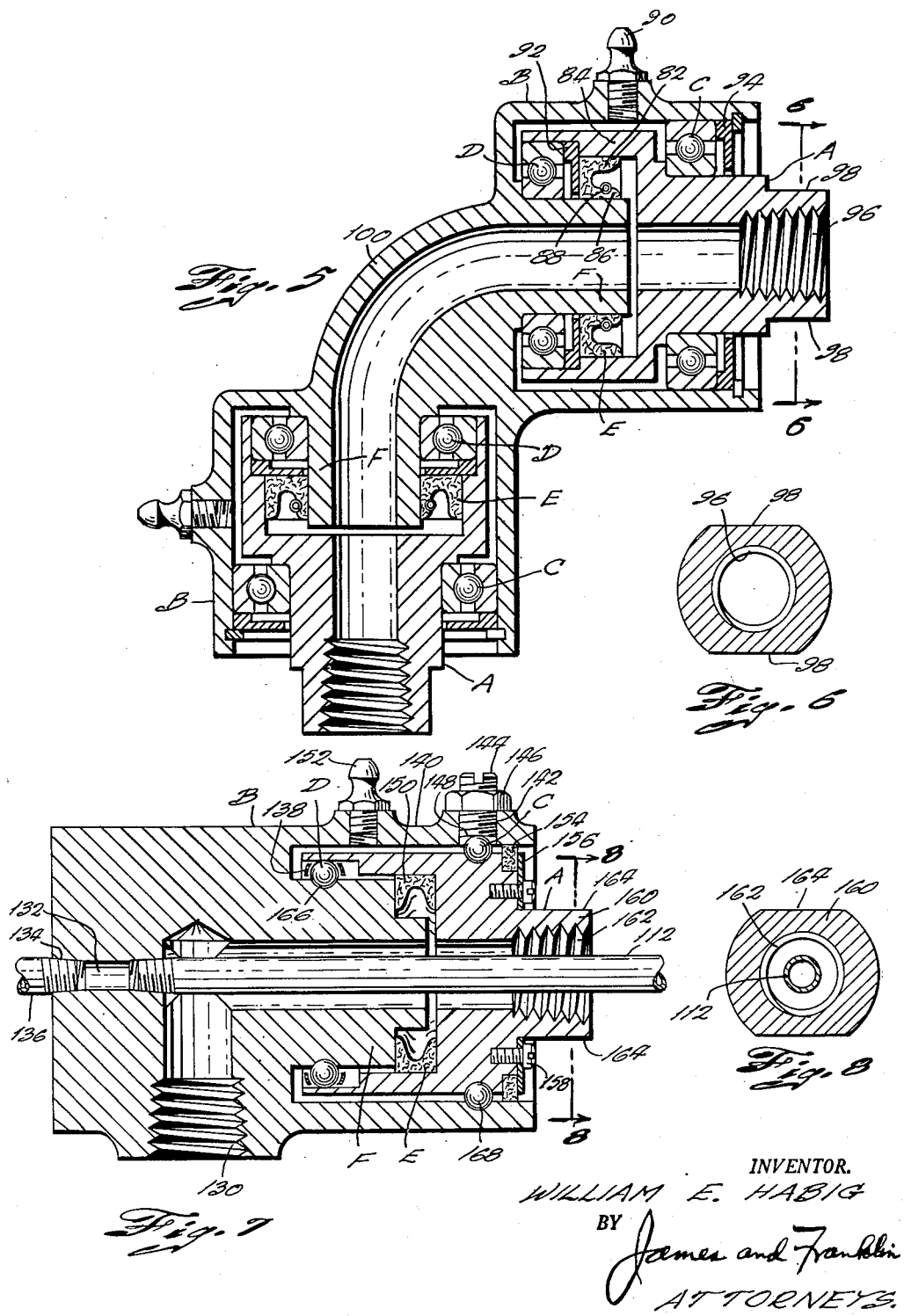

April 20, 1954 W. E. HABIG 2,676,039
SWIVEL COUPLING
Filed July 1, 1949 3 Sheets-Sheet 3
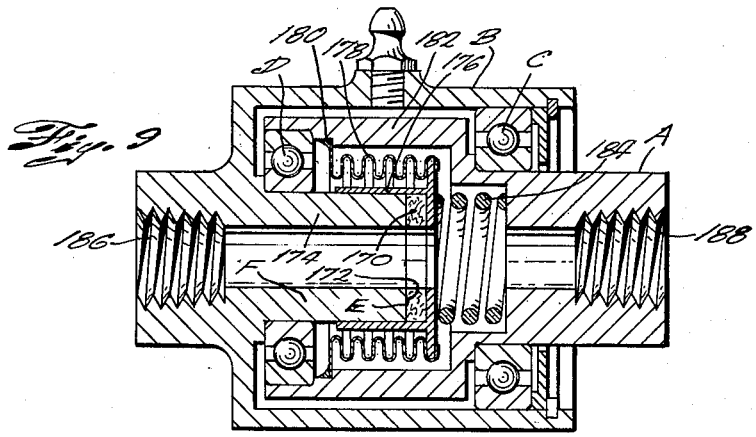
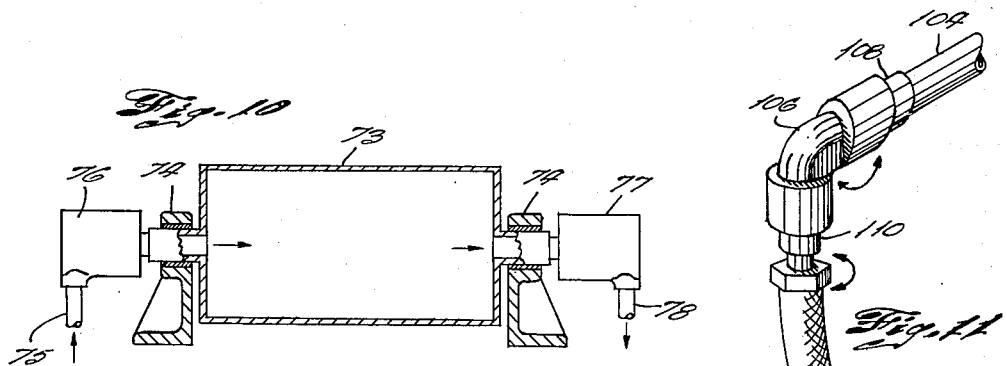
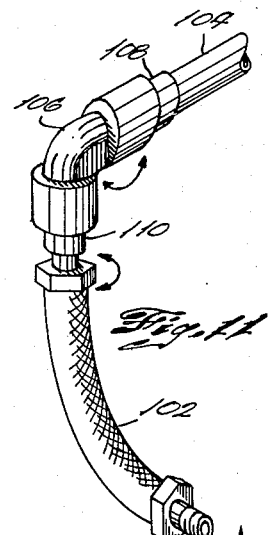
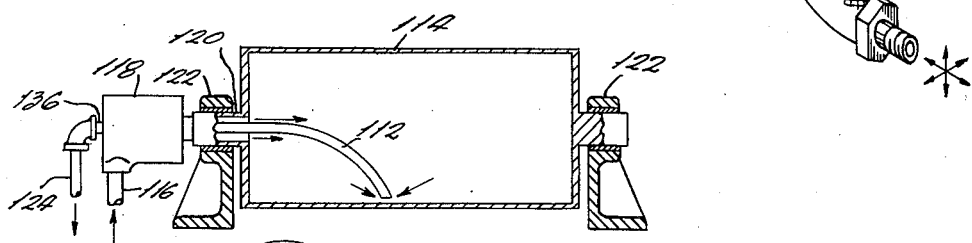
INVENTOR.
WILLIAM E. HABIG
BY
James and Franklin
ATTORNEYS.

Patented Apr. 20, 1954

2,676,039

UNITED STATES PATENT OFFICE 2,676,039

SWIVEL COUPLING

William E. Habig, Port Jervis, N. Y.

Application July 1, 1949, Serial No. 102,526

16 Claims. (Cl. 285—97.3)

This invention relates to piping and hose, and more particularly to a swivel coupling for the same.

The primary object of the invention is to generally improve swivel couplings. Another object is to provide bearings which are well spaced apart axially, so that the swivel coupling is relatively rigid against transverse rocking. Still another object is to keep the coupling compact in size. A more particular object is to locate the packing of the coupling between the bearings (in an axial direction) in order to minimize wear at the packing in the event of transverse rocking of the portions of the coupling. Still another object is to so dispose the packing that it seals or takes effect between the interior of the coupling and both of the spaced bearings, in order to protect the bearings from exposure to the fluid medium carried by the coupling.

Other and more detailed objects of the invention are to facilitate lubrication of the bearings; to retain the lubricant against escape to the outside or to the interior of the coupling; and to facilitate the connection of piping or hose to the coupling. Another object is to adapt the coupling for use with any of a variety of types of packing. Still another object is to adapt the coupling for use in varied industries and applications, including the provision of straight-line and elbow couplings; a double swivel elbow; and couplings having a concentric tube running therethrough for return flow.

In general the swivel coupling comprises an inner portion adapted to be connected to one pipe, an outer portion adapted to be connected to another pipe, a first bearing between said portions, a second bearing between said portions spaced axially from the first bearing, and packing disposed between the inner and outer portions. The packing is located between the bearings in an axial direction, thereby minimizing the outside dimension, and also reducing motion and wear at the packing in the event of transverse rocking of the portions of the bearing. Moreover, the packing is located between and takes effect between the interior of the coupling and the bearings. For this purpose the outer portion is preferably provided with a reentrant tube projecting into the inner portion, and one bearing is disposed between the inner portion and the reentrant tube. The packing is disposed between the inner portion and the reentrant tube within the said bearing.

To accomplish the foregoing objects, and such other objects as will hereinafter appear, the invention resides in the swivel coupling, bearings, and packing elements, and their relation one to the other as are hereinafter more particularly described in the following specification. The specification is accompanied by drawings, in which:

Fig. 1 is a section of a swivel coupling embodying features of my invention;

Fig. 2 is an end view of the same;

Fig. 3 is a longitudinal section through a modified swivel coupling;

Fig. 4 is a fragmentary end view of the same;

Fig. 5 is a longitudinal section through a double swivel elbow coupling;

Fig. 6 is a section taken in the plane of the line 6—6 of Fig. 5;

Fig. 7 is a longitudinal section through a swivel coupling having a concentric pipe;

Fig. 8 is a section taken approximately in the plane of the line 8—8 of Fig. 7;

Fig. 9 is a longitudinal section through a swivel coupling embodying a different form of packing;

Fig. 10 is a partially sectioned elevation schematically showing one use for a coupling of the type shown in Fig. 3;

Fig. 11 is a perspective view showing an application or use for the double swivel elbow shown in Fig. 5; and Fig. 12 is a partially sectioned elevation schematically showing one use for the swivel coupling shown in Fig. 7.

Referring generically to all forms of the invention shown in the drawing, the swivel coupling comprises an inner portion A adapted to be connected to one pipe, an outer portion B adapted to be connected to another pipe, a first bearing C between said portions, a second bearing D between said portions and spaced axially from the first bearing C, and packing E located between the inner portion A and the outer portion B in order to seal the coupling against leakage. It will be noted that the packing is located between the bearings C and D in an axial direction, thereby minimizing any motion at the packing in the event of play or transverse rocking of the portions A and B relative to one another. This arrangement also makes for compactness in axial dimension. The packing E takes effect between the interior of the coupling and bearings C and D, thereby protecting the bearings from exposure to the fluid carried by the coupling. The outer portion B has a reentrant tube F which projects into the inner portion A. The bearing D is disposed between the inner portion A and the reentrant tube F, and the same applies to the packing E.

From another viewpoint it may be stated that the inner and outer portions are so shaped and disposed that the inner portion A extends from the inside of the bearing C to the outside of the bearing D, while the outer portion B extends from the inside of the bearing D to the outside of the bearing C.

Described in still another fashion, it may be stated that one swivel portion has concentric tubular members B and F, and that the other swivel portion A is received between the said tubular members. The bearing C is received between the portion A and the outer tubular member B, while the bearing D is received between the portion A and the inner tubular member F. The packing E is disposed between the portion A and the inner tubular member F at a point located within the bearing D, or in other words, between the spaced bearings C and D (in an axial direction).

Considering the drawings in greater detail, and referring first to the simple straightline coupling shown in Figs. 1 and 2, the inner member A has a small diameter part 12 and a large diameter part 14. The part 12 is internally threaded at 16 to receive a pipe. The reentrant part F of the outer portion B is similarly internally threaded at 18 to receive a pipe, the pipes being in coaxial alignment as shown. The bearings C and D are here shown as ball bearings with inner and outer races. It will be understood, however, that other anti-friction bearings may be used, and indeed the invention, considered in its broadest aspect, would not necessarily require the use of anti-friction bearings. The inner race 20 of bearing C is received with a tight fit on the outside of the smaller diameter part 12. The outer race 22 is received with a snug fit inside the outer portion 24. In the case of bearing D the inner race 26 is received snugly on the outside of the reentrant part F, while the outer race 28 is received snugly within the larger diameter part 14 of the inner member.

A lubricant retainer ring 30 is preferably disposed inside the bearing D. The clearance between the inside of this ring and the reentrant part F has been exaggerated in the drawing in order to show that these parts are relatively rotatable. The retainer ring 30 acts also as a support ring against which the packing E may be pressed. In the particular case here shown the packing E is a simple U-type of packing in which the pressure of the fluid carried by the coupling serves to itself expand the packing and thus seal the same.

The coupling preferably includes another lubricant retainer ring 32, this being disposed outside the bearing C. Here again the clearance at the inside of the ring has been exaggerated for clarity. The retainer ring 32 is held in place by means of a split locking ring 34. This expands into a mating groove on the inside of the outer wall 24.

The coupling may be lubricated through a hole 36. This is normally covered by means of a split resilient band 38. By sliding the band axially or rotating it to a proper position the hole 36 is exposed for the admission of a lubricant.

In the present case the hole 36 also functions to receive a capstan bar, one end of which is shown at 40. This may be passed into a mating hole 42 in the inner member A, thereby locking the inner member against rotation. This is done when connecting the threaded end of a pipe into the thread 16, or when removing the same. The use of such a capstan bar arrangement makes it possible to minimize the axial direction of the coupling when great compactness is desired.

A modified form of coupling is shown in Figs. 3 and 4. It differs in being an elbow swivel; in utilizing a different type of packing; and in other respects which will appear. The outer portion B is extended at 50 and provided with a transverse passage 52 terminating in a pipe thread 54. This may be disposed at any desired angle to the axis of the coupling, but the example shown is the most common example, with the pipe connection 54 at right angles to the axis of the coupling.

The packing is a herring-bone or V type of packing having a number of packing rings supported in V shape between metal rings 56 and 58. The latter is urged axially by means of a compression spring 60 which in turn reacts against a lubricant retainer ring 62. Lubricant may be supplied to the bearings through a conventional grease nipple 64. Another lubricant retainer is provided at 66, it being held in position by means of a split locking ring 68 sprung into a mating groove. As before, it will be understood that the clearance at the inside of the retainer rings 62 and 66 has been greatly exaggerated in the drawings for the sake of clarity.

The tightness of the packing may be controlled by adjusting the pressure exerted by the compression spring 60. This is done by means of a threaded gland 67 received in a mating thread in the outside wall 69. The gland may be adjusted by means of a special wrench having pins received in holes 71. When the gland is tightened it moves the bearing C and associated retainer ring 66 toward the left, thereby bodily moving the entire inner portion A and the packing toward the left, thus increasing the compression of the spring 60. If desired, locking means such as a set screw (not shown) may be provided to lock the adjustment of the gland.

In the present coupling the inner member is provided with a projection 70 having a male thread. Moreover, the opposite sides of the projection inside the threaded part 70 are flattened, as is indicated at 72, thus adapting the same to receive an ordinary wrench. If desired, the part 72 might be left round to receive a Stillson wrench. In either case it is unnecessary to provide a capstan bar such as was shown in connection with Fig. 1. The need for a capstan bar is eliminated by projecting the part 72 outside the main body of the coupling, thus making it possible to apply a wrench thereto. If an internal or female thread is provided, the thread may be located within the part 72, thereby eliminating the further projecting part 70, and in such case the overall projection may be much shorter, as is shown in some of the succeeding figures of the drawing.

One use or application for the swivel coupling shown in Fig. 3 is schematically illustrated in Fig. 10, referring to which it will be seen that a large hollow roll or drum 73 is rotatably carried by means of hollow trunnions in stationary bearings 74. The drum is to be heated or cooled by means of a suitable liquid. The liquid is supplied through a pipe 75 and a swivel coupling 76 at one end of the drum, and is discharged through a swivel coupling 77 and a pipe 78 at the other end of the drum.

Referring now to Fig. 5, this shows an elbow coupling with a double swivel. In this case the packing is a known commercial packing which is a modified U-type of packing. The outer wall 82 of the packing is hard, and is dimensioned to be received with a tight or force fit within the annular wall 84. The inner part 86 is contracted inward by means of a helically coiled spring 88 acting as a resilient band which forms a part of the packing. Sealing action may be obtained as before in response to the pressure of the fluid in the coupling, but even when handling fluid having no appreciable pressure the packing will exert a sealing action because of the spring 88.

As before, lubricant may be delivered through a suitable nipple 90, and is retained between lubricant retainer rings 92 and 94. The inner member is internally threaded at 96, and the projecting portion may be provided with flats 98 to receive a wrench. The second swivel coupling shown on a vertical axis may be identical with the first swivel coupling, the two being connected by an integral wall 100. The elbow may be made at any desired angle, the 90° angle here shown being the most common.

One application or use of the double swivel coupling shown in Fig. 5 is illustrated in Fig. 11. Referring to that figure, a metal hose 102 is connected to a stationary supply pipe 104. It is a characteristic of metal hose that it should not be twisted. By using the double swivel coupling the tendency toward twisting the hose is minimized or eliminated. The double swivel coupling is shown at 106, the first turning or swivel action taking place at 108, and the second swivel action taking place at 110. It will be evident that the swivel 108 permits the hose to be swung in one direction or another laterally of the pipe 104, thereby avoiding reverse bends in the hose, while the swivel 110 permits the hose to be turned without any need for twisting the same. This greatly prolongs the life of metal hose.

The further modification shown in Fig. 7 illustrates a number of changes. One is the provision of a concentric pipe 112. This is of advantage for return flow when dealing with a machine in which two connections are to be made at one side of the machine. Thus, referring to Fig. 12, the drum or calendar roll 114 is heated by steam. The steam is supplied by pipe 116 and swivel 118 through the hollow trunnion 120 at one end of the drum. The drum is rotatably carried in bearings 122. The steam condensate is removed through a return pipe 112 which passes through the swivel coupling, a suitable external connection being made at 124.

Reverting now to Fig. 7, it will be seen that the main passage is turned in elbow fashion and is provided with an internal thread at 130. The pipe 112 leads to an auxiliary passage 132 which is threaded at 134 for connection to a pipe or nipple 136. The main and auxiliary passages may be arranged differently than shown, the essential requirement being that the passages be independent and separated for two different pipe connections.

The modification shown in Fig. 7 also illustrates the use of ball bearings with integral races. The balls of bearing D are separated by means of a spacer ring 138. They run in a shallow groove formed on the reentrant part F of the coupling. The balls of the other bearing C may be dropped into position after assembling the parts of the swivel coupling together. For this purpose the outer wall 140 is provided with an opening 142 through which the balls may be dropped. After filling the bearing with the necessary number of balls the hole 142 is closed by means of a threaded plug 144. This may be adjusted to suitable height, and then locked by means of a locknut 146. The radius of curvature at the lower end 148 of the plug conforms to the radius of curvature of the entire bearing race, and therefore the orientation of the plug is of no consequence. The only precaution needed is to screw the plug in for the right distance.

In this case the packing is also different from those heretofore described. The packing ring 150 is of the U-type and is expanded by the pressure of the fluid carried in the coupling, but the ring is arranged to expand axially or in thrust, instead of radially.

The coupling may be lubricated through a nipple 152. The lubricant is retained by means of a felt retainer ring 154 confined by a metal ring 156 held in place by means of screws 158.

The inner portion of the coupling projects at 160 and is internally threaded at 162. The outside is provided with flats 164 to receive a wrench.

To assemble this coupling the ring of balls for bearing D is preliminarily disposed around the integral race 166. The packing 150 is inserted in the inner portion of the coupling, and the latter is then slid into the outer portion of the coupling. The balls 168 are then dropped successively through the opening 142, following which the plug 144 and locknut 146 are added and properly adjusted. The lubricant retainer 154 and its support ring 156 may then be added. The pipe 112 is then passed through the coupling and screwed in place.

The coupling shown in Fig. 9 is a straight coupling, but illustrates the use of a very different and relatively hard packing, specifically, a graphite ring. This is indicated at 170, and bears against the inner end 172 of the reentrant tube 174 of the coupling. The graphite ring 170 is held in place by means of a floating sleeve 176. This is flanged at its right end (as viewed in the drawing) and is secured at its periphery to one end of a flexible metal bellows 178. The left end of the bellows is secured at 180 to the wall 182 of the inner portion of the coupling (for example by solder or by welding). The arrangement is such that the pressure of the fluid in the coupling tends to force the sealing ring 170 against the end 172 of the reentrant tube 174. However, a compression spring 184 may also be used. This holds the seal closed even when handling fluids under little or no pressure. The clearance around the outside of the spring 184 has been exaggerated for clarity. In practice the spring is retained in position by the surrounding wall. The connection of the bellows at both ends is soldered or otherwise made leakproof, and the only leakage possible is at the sliding bearing surfaces between the graphite sealing ring 170 and the adjacent surfaces.

The outer portion of the coupling has a pipe thread at 186, and the inner portion of the coupling has a pipe thread at 188. The latter projects somewhat from the housing of the coupling, and may be flattened to receive an ordinary wrench, or may be ridged or left round to receive a Stillson wrench.

It will be understood that the flexible bellows 178 affords self-adjustable seating of the packing ring 170, and what is equally important, makes the sealing pressure independent of outside forces applied to the swivel coupling. Rocking of the parts of the coupling, or external pulls or pushes on the pipes or hoses connected to the coupling, will not affect the sealing pressure at the packing.

Despite the radically different nature of the packing shown in this form of my invention, it will be seen that the packing is located between the axially spaced bearings, and further that the packing is interposed between the interior of the coupling and the bearings, just as was the case in the other forms of coupling shown.

It will be understood that either or both ends of any of the couplings may be provided with a male thread, such as is shown at the right end of Fig. 3, instead of a female thread, such as is shown in the other drawings; that the herringbone or V type packing of Fig. 3 may be used in many of the other swivel couplings; that the spring tightened packing shown in Fig. 5 may be used in most of the other couplings; that the capstan bar of Fig. 1 may be used in the other couplings; that a lubricant nipple may be used in the coupling shown in Fig. 1; and in general that the various features shown in the different couplings are illustrative and may be interchanged to meet the needs of any particular case.

It is believed that the construction, operation and advantages of my improved swivel coupling will be apparent from the foregoing detailed description thereof. The bearing is relatively rigid, for with a specified outside dimension the two bearings may be widely spaced apart axially, or from another viewpoint, with a specified axial spacing between bearings the outside dimension may be greatly reduced. The introduction of the packing does not increase the axial dimension of the coupling because the packing is located in the space already available between the two axially spaced bearings. This is in addition to the advantage of minimizing any motion at the packing and thereby minimizing wear or loosening of the sealing action at the packing resulting from play or rocking of the main parts of the coupling. The packing is interposed between the interior of the coupling and the antifriction bearings, thereby protecting the bearings against attack by the fluid carried by the coupling. The improved coupling may be applied to various situations, requirements and uses, some of which have been described in detail above.

It will therefore be apparent that while I have shown and described my invention in several preferred forms, changes may be made in the structures shown without departing from the scope of the invention as sought to be defined in the following claims. In many of the claims I have, for convenience and brevity, referred to the anti-friction bearings as ball bearings, but it will be understood that other anti-friction bearings may be employed.

It will be understood also that while I have shown special means for the introduction of lubricant, this is not at all essential, and instead the bearings may be lubricated when assembling the coupling by using a substantially permanent lubricant, such as one of the silicone greases.

I claim:

1. A swivel coupling comprising an inner portion adapted to be connected to one pipe, an outer portion adapted to be connected to another pipe, said outer portion having a reentrant tube projecting into the inner portion, said outer portion at least partially surrounding said inner portion, and said inner portion at least partially surrounding said reentrant tube, a first bearing disposed between the inner and outer portions, a second bearing disposed between the inner portion and the reentrant tube of the outer portion, said second bearing being spaced axially from the first, and packing disposed between the inner portion and the reentrant tube, said packing being located between said bearings in an axial direction, said packing being made of a material different from said inner and outer portions and suitable for use as a packing therebetween, and said inner portion and said reentrant tube differing in diameter at said packing to form a space in which said packing is received.

2. A swivel coupling comprising an inner portion adapted to be connected to one pipe, an outer portion adapted to be connected to another pipe, said outer portion having a reentrant tube projecting into the inner portion, a first ring of ball bearings disposed between the inner and outer portions, a second ring of ball bearings disposed between the inner portion and the reentrant tube of the outer portion, said second ring of ball bearings being spaced axially from the first ring by a substantial distance, and packing disposed between the inner portion and the reentrant tube, said packing being located between said bearings in an axial direction, whereby said packing is disposed between the interior of the coupling and the bearings in order to protect the bearings from the fluid carried by the coupling.

3. A swivel coupling comprising a first portion adapted to be connected to one pipe, a second portion adapted to be connected to another pipe, a first ring of ball bearings between said portions, a second ring of ball bearings between said portions and spaced axially from said first ring by a substantial distance, said portions being so shaped and disposed that one of said portions extends from the inside of one of said bearings to the outside of the other bearing, while the other portion extends from the inside of the latter bearing to the outside of the first bearing, and packing between said portions located at a point between said spaced bearings in an axial direction, said packing being disposed between the interior of the coupling and the bearings in order to protect the bearings from the fluid carried by the coupling.

4. A swivel coupling comprising a first portion having inner and outer concentric tubular members adapted to be connected to one pipe, a second portion having a tubular part dimensioned to be received between said tubular members and adapted to be connected to another pipe, a first bearing between the second portion and the inner member of the first portion, a second bearing between the second portion and the outer member of the first portion, said bearings being axially displaced from one another, and packing disposed between the second portion and the inner member of the first portion at a point located between said spaced bearings in an axial direction.

5. A swivel coupling comprising a first portion having inner and outer concentric tubular members adapted to be connected to one pipe, a second portion having a tubular part dimensioned to be received between said tubular members and adapted to be connected to another pipe, a first ring of ball bearings disposed between the second portion and the inner member of the first portion, a second ring of ball bearings disposed between the second portion and the outer member of the first portion, said rings being axially displaced from one another, and packing disposed between the second portion and the inner member of the first portion at a point located between said spaced bearings in an axial direction, whereby movement at said packing is minimized in the event of transverse rocking of the portions, and whereby said packing is disposed between the interior of the coupling and said bearings in order to protect the bearings from the fluid carried by the coupling.

6. A swivel coupling as defined in claim 1, comprising further a lubricant retaining ring disposed outside the first bearing, a second lubricant retaining ring disposed inside the second bearing between the second bearing and the packing, and means on the outer portion to facilitate the feeding of lubricant between the outer and inner portions.

7. A swivel coupling as defined in claim 1, in which there is a lubricant retaining ring inside the second bearing between the bearing and the packing, said ring acting as a reaction means against which pressure may be exerted on the packing to spread the same.

8. A double swivel elbow coupling comprising a first swivel coupling as defined in claim 1, a second swivel coupling as defined in claim 3, the outer portions of said swivel couplings being formed integrally with one another and being disposed with their axes at an angle to one another to form an elbow.

9. A swivel coupling with a concentric pipe, said coupling being arranged as defined in claim 1, the pipe connection to the outer portion leading to a main flow passage through the outer and inner portions, and a concentric pipe of relatively small diameter being disposed axially of and passing through the inner portion to a secondary flow passage through the outer portion, said secondary flow passage being independent and having a separate pipe connection to the outer portion.

10. A swivel coupling as defined in claim 1, in which the packing includes a flexible metal bellows and a graphite packing ring, said ring bearing against the reentrant tube, and said bellows extending from said ring at one end of the bellows to the inner portion of the coupling at the other end of the bellows.

11. A swivel coupling as defined in claim 2, comprising further a lubricant retaining ring disposed outside the first bearing, a second lubricant retaining ring disposed inside the second bearing between the second bearing and the packing, and means on the outer portion to facilitate the feeding of lubricant between the outer and inner portions.

12. A swivel coupling as defined in claim 2, in which there is a lubricant retaining ring inside the second bearing between the bearing and the packing, said ring acting as a reaction means against which pressure may be exerted on the packing to spread the same.

13. A double swivel elbow coupling comprising a first swivel coupling as defined in claim 2, a second swivel coupling as defined in claim 4, the the outer portions of said swivel couplings being formed integrally with one another and being disposed with their axes at an angle to one another to form an elbow.

14. A swivel coupling with a concentric pipe, said coupling being arranged as defined in claim 2, the pipe connection to the outer portion leading to a main flow passage through the outer and inner portions, and a concentric pipe of relatively small diameter being disposed axially of and passing through the inner portion to a secondary flow passage through the outer portion, said secondary flow passage being independent and having a separate pipe connection to the outer portion.

15. A swivel coupling as defined in claim 2, in which the packing includes a flexible metal bellows and a graphite packing ring, said ring bearing against the reentrant tube, and said bellows extending from said ring at one end of the bellows to the inner portion of the coupling at the other end of the bellows, and a compression spring urging said graphite ring axially against the inner end of the reentrant tube.

16. A swivel coupling having a hollow interior acting as a conduit between two pipes, said coupling comprising a first portion adapted to be connected to one pipe, a second portion adapted to be connected to the other pipe, a first bearing between said portions, a second bearing between said portions and spaced axially from said first bearing, said portions being so shaped and disposed that one of said portions extends from the inside of the first bearing in a direction away from the second bearing and then reversely back toward the second bearing to the outside of the second bearing, while the second portion extends from the inside of the second bearing toward the first bearing and to the outside of the first bearing, said second portion being at least partially surrounded by the reversely extending part of the first portion, and packing acting as a seal between the part of the first portion receiving the inside of the first bearing, and the part of the second portion receiving the outside of the first bearing, said packing being located at a point between said spaced bearings in an axial direction, said packing being disposed to act as a seal between the hollow interior of the coupling and the bearings, and thereby acting as a barrier to protect the bearings from the substance carried in the conduit, said packing being made of a material different from said first and second portions and suitable for use as a packing therebetween, and said portions differing in diameter at said packing to form a space in which said packing is received.

References Cited in the file of this patent

UNITED STATES PATENTS

| Number | Name | Date |
|---|---|---|
| 733,065 | Martin | July 7, 1903 |
| 980,776 | Hardsocg | Jan. 3, 1911 |
| 1,795,867 | Kuhn | Mar. 10, 1931 |
| 1,854,638 | Woods | Apr. 19, 1932 |
| 2,036,537 | Otis | Apr. 7, 1936 |
| 2,166,232 | Brownell | July 18, 1939 |
| 2,176,532 | Lane et al. | Oct. 17, 1939 |
| 2,270,928 | Browne | Jan. 27, 1942 |
| 2,365,048 | Bruno | Dec. 12, 1944 |
| 2,407,745 | Jacobson | Sept. 17, 1946 |